（12） United States Patent
Suzuki et al.

(10) Patent No.: US 7,104,674 B2
(45) Date of Patent: Sep. 12, 2006

(54) INTERIOR ILLUMINATION LAMP

(75) Inventors: Hiroyuki Suzuki, Haibara-gun (JP); Kimihiro Ishii, Haibara-gun (JP); Motoya Kimura, Toyota (JP); Hiroshi Ando, Kariya (JP)

(73) Assignee: Yazaki Corporation, Tokyo (JP)

( * ) Notice: Subject to any disclaimer, the term of this patent is extended or adjusted under 35 U.S.C. 154(b) by 35 days.

(21) Appl. No.: 10/969,212

(22) Filed: Oct. 21, 2004

(65) Prior Publication Data

US 2005/0152150 A1 Jul. 14, 2005

(30) Foreign Application Priority Data

Oct. 22, 2003 (JP) ............................ P2003-361794

(51) Int. Cl.
*B60Q 1/00* (2006.01)
(52) U.S. Cl. ...................... 362/488; 362/365; 362/364
(58) Field of Classification Search ................ 362/488, 362/490, 365
See application file for complete search history.

(56) References Cited

U.S. PATENT DOCUMENTS 6,595,656 B1 * 7/2003 Yoda ........................... 362/187
6,595,668 B1 * 7/2003 Hatagishi et al. ........... 362/490
6,746,139 B1 * 6/2004 Sinzawa et al. ............. 362/490

FOREIGN PATENT DOCUMENTS

JP            2000-1141 A      1/2000

* cited by examiner

*Primary Examiner*—Ali Alavi
(74) *Attorney, Agent, or Firm*—Sughrue Mion, PLLC

(57) ABSTRACT

An interior illumination lamp 10 including a design portion 20 in which a lens 54 is fixed to a bezel 22 of a housing 21 capable of being attached to an opening 13a provided at an interior member 13 of a vehicle 11, a functional portion 30 arranged to a rear side of the interior member 13 by being supported by the design portion 20 and having a light source 37, and a guide portion 26 in a groove-like shape provided for guiding an electric wire W/H connected to the functional portion 30, in which a clip 25 is arranged to a notched portion 26b provided at a wall portion 26a of the guide portion 26 and front ends of the wall portion 26a interposing the notched portions 26b are connected to ride over the notched portions 26b. That is, upper portions of the notched portions 26b of the clips 25 provided at the guide portion 26 are connected and therefore, the electric wire W/H wired along the guide portion 26 can be prevented from extruding from the notched portion 26b to be bit thereby. Further, erroneous wiring can be prevented by wiring an electric wire along the guide portion 26.

4 Claims, 6 Drawing Sheets

INTERIOR ILLUMINATION LAMP

BACKGROUND OF THE INVENTION

1. Field of the Invention

The present invention relates to an interior illumination lamp, for example, relates to an interior illumination lamp attached to a door, a ceiling or the like of an automobile.

2. Related Art

There is disclosed an interior illumination lamp of a background art shown in, for example, FIG. 5 in Japanese Unexamined Patent Publication 2000-1141.

The interior illumination lamp 100 is used by being attached to, for example, a back door of a station wagon, and by changing an irradiating direction, a luggage room provided at a rear portion of the station wagon or a lower side of the opened back door can be irradiated.

As shown by FIG. 5, according to the interior illumination lamp 100, a lamp housing 102 is attached to a trim 101 forming a wall face of the back door and an opening 103 in a circular shape is provided on a front side of the lamp housing 102. A lamp support portion 104 having an inner face in a spherical shape is provided rearward from the opening 103 (right side of FIG. 5), and the inner side of the lamp support portion 104 is provided with a lamp main body 105 rotatably by 360 degrees in a predetermined range. Inside of the lamp main body 105 is mounted with a bulb 106 and a front face (left face of FIG. 5) is provided with a lens portion 107 projected from the opening 103 of the lamp housing 102. A space S is provided between the lens portion 107 and the opening 103 to restrict an amount of rotating the lamp main body 105.

Meanwhile, as shown by FIG. 6, there is also an interior illumination lamp 110A provided with the above-described interior illumination lamp 100 at inside of a vehicle compartment for irradiating light respectively to left and right seats. According to the interior illumination lamp 110A, inside of a functional portion main body 111 is provided with bulbs 112L, 112R constituting 2 pieces of light sources for the left and right seats. The respective bulbs 112L, 112R are attached respectively to bezels 113L, 113R, and by adjusting directions of the bezels 113L, 113R, light lay is irradiated to desired portions of the left and right seats. Further, electric parts of left and right switches 114L, 114R or the like are attached to between the left and right bulbs 112L, 112R, and the switch 114L is connected to a power source by a wire harness W/H.

According to such an interior illumination lamp 110A, there is a concern of misleading a path of wiring the wire harness W/H (wiring path shown in FIG. 6) and even when a problem is not particularly posed electrically, there is a case of biting the wire harness W/H by, for-example, a clip 115 for being attached to a roof or the like, and there is a case of bringing about a drawback in view of settlement of the wire harness W/H.

SUMMARY OF THE INVENTION

The invention has been carried out in view of the above-described problem and it is an object thereof to provide an interior illumination lamp capable of preventing an electric wire from being integrated erroneously and protecting the electric wire.

In order to achieve the above-described object, according to the invention, there is provided an interior illumination lamp provided in including a design portion in which a lens is fixed to a bezel of a housing capable of being attached to an opening provided at an interior member of a vehicle, a functional portion arranged on a rear face side of the interior member by being supported by the design portion and having a light source, and a guide portion in a groove-like shape provided for guiding an electric wire connected to the functional portion, wherein a clip is arranged to a notched portion provided at a wall portion of the guide portion, and front ends of the wall portion interposing the notched portions are connected to ride over the notched portions.

According to the interior illumination lamp constituted in this way, in order to attach the interior illumination lamp to the opening of the interior member of the vehicle, the upper portions of the notched portions for the clips provided at the guide portion are connected and therefore, the electric wire wired along the guide portion can be prevented from extruding from the notched portion to be bit thereby. Further, erroneous wiring can be prevented by wiring the electric wire along the guide portion.

According to the invention, a concern of erroneous wiring an electric wire and biting the electric wire in attaching as in the interior illumination lamp of the background art can be resolved.

DETAILED DESCRIPTION OF THE PREFERRED EMBODIMENTS

A detailed explanation will be given of an embodiment according to the invention in reference to the drawings as follows.

Figure 1:
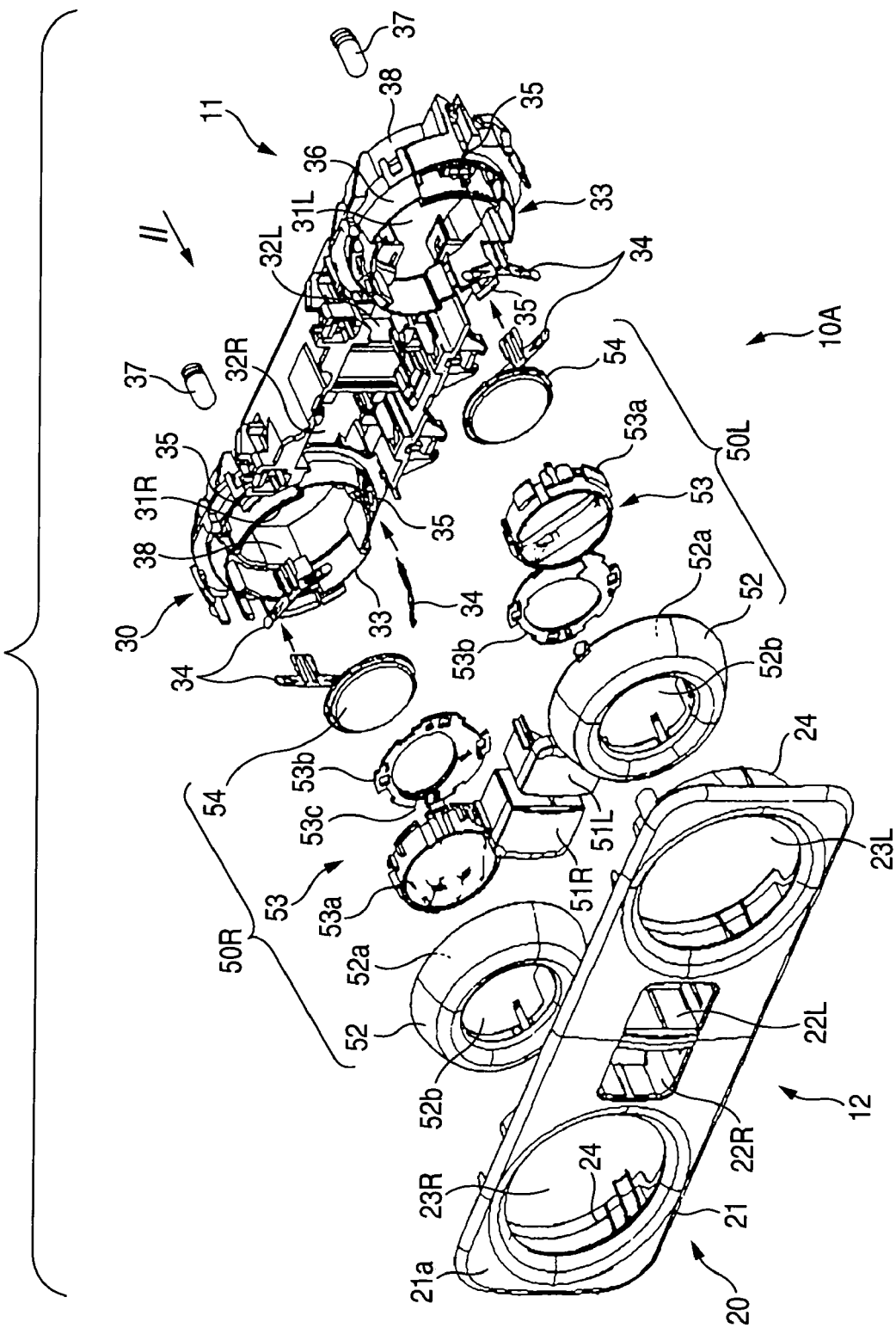
FIG. 1 is a disassembled perspective view showing an embodiment of an interior illumination lamp according to the invention.

As shown by FIG. 1, an interior illumination lamp 10 according to the embodiment of the invention includes a design portion 20 exposed to vehicle compartment inside 12 (refer to FIG. 4), and a functional portion main body 30 as a main body disposed on an inner side of the design portion 20 and attached with various electric parts or the like.

Figure 4:
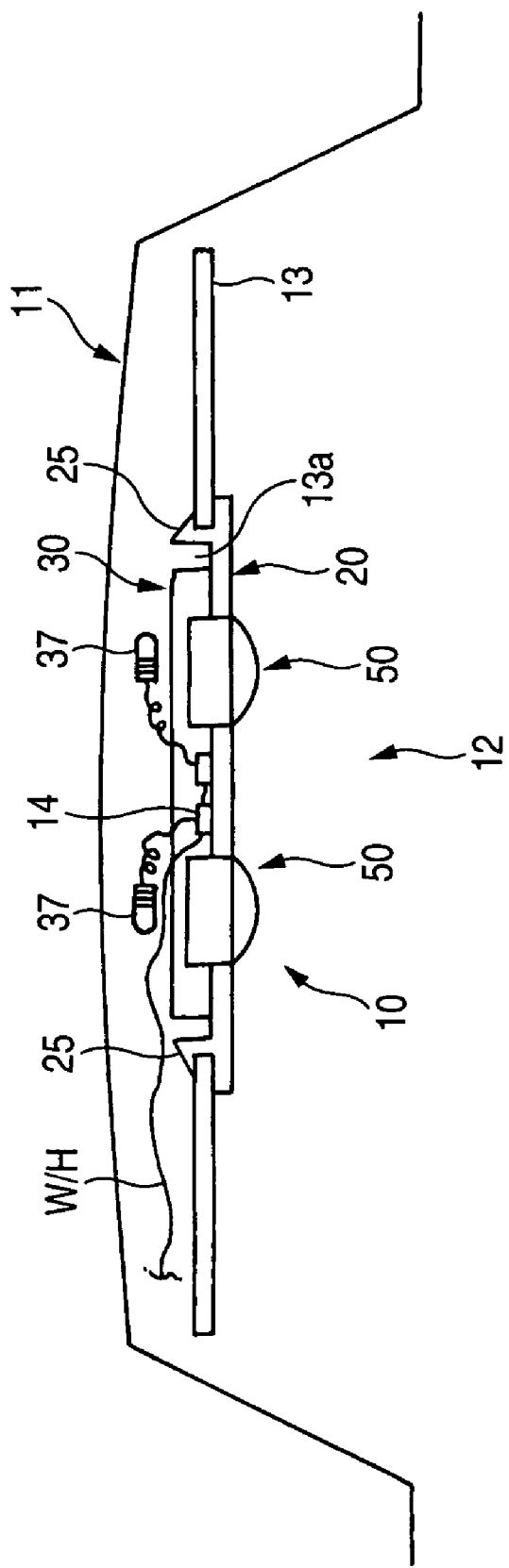
FIG. 4 is a sectional view showing a state of attaching the interior illumination lamp according to the invention to a vehicle.
Figure 5:
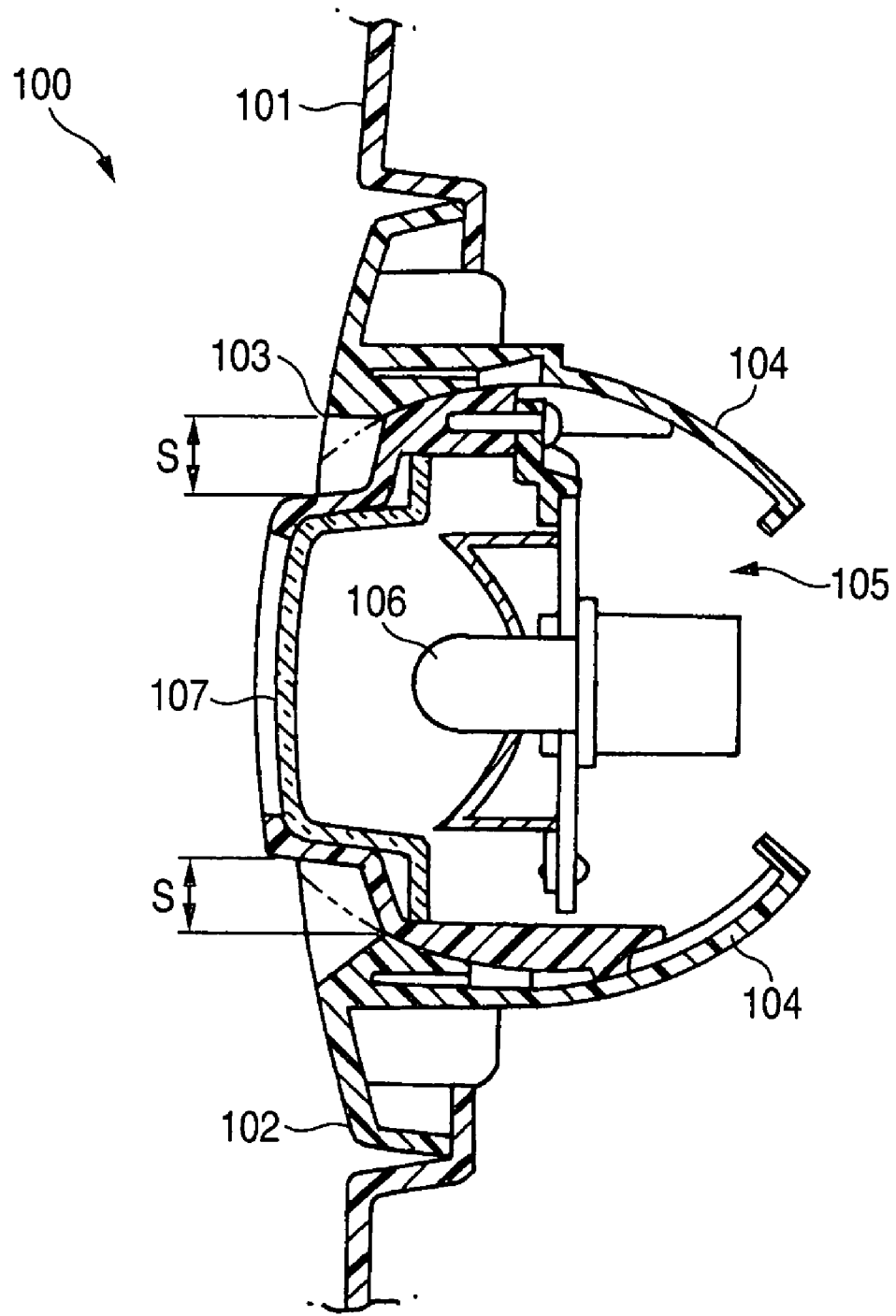
FIG. 5 is a sectional view showing an example of an interior illumination lamp of a background art.
Figure 6:
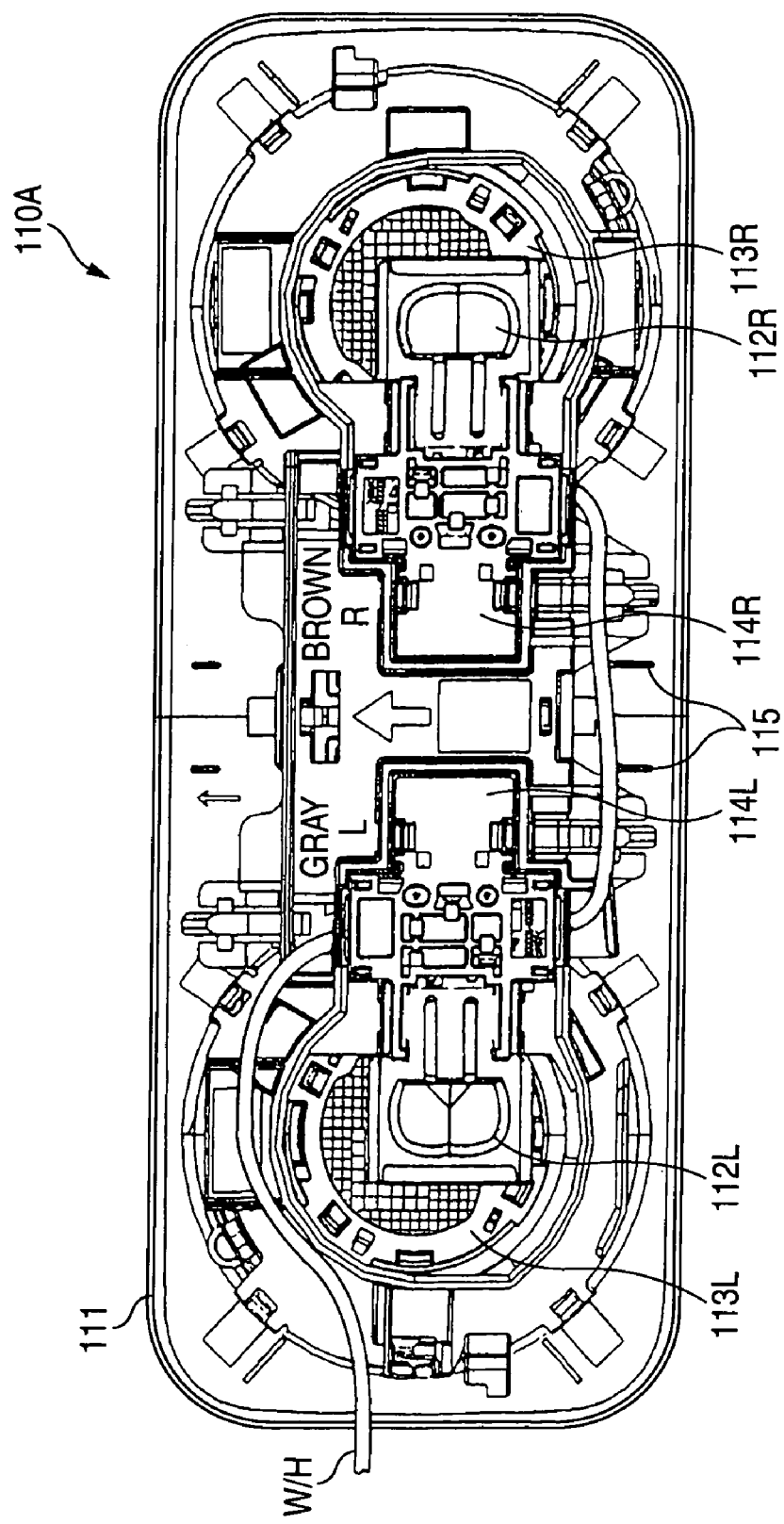
FIG. 6 is a rear view showing a state of carrying out erroneous wiring in other example of an interior illumination lamp of the background art.

As shown by FIG. 4, the interior illumination lamp 10 is attached by attaching the design portion 20 to an opening 13a of an interior member (trim) 13 provided on an inner side of a vehicle 11, and connected to a wire harness W/H as an electric wire previously wired to a rear side of the interior member 13.

Figure 2:
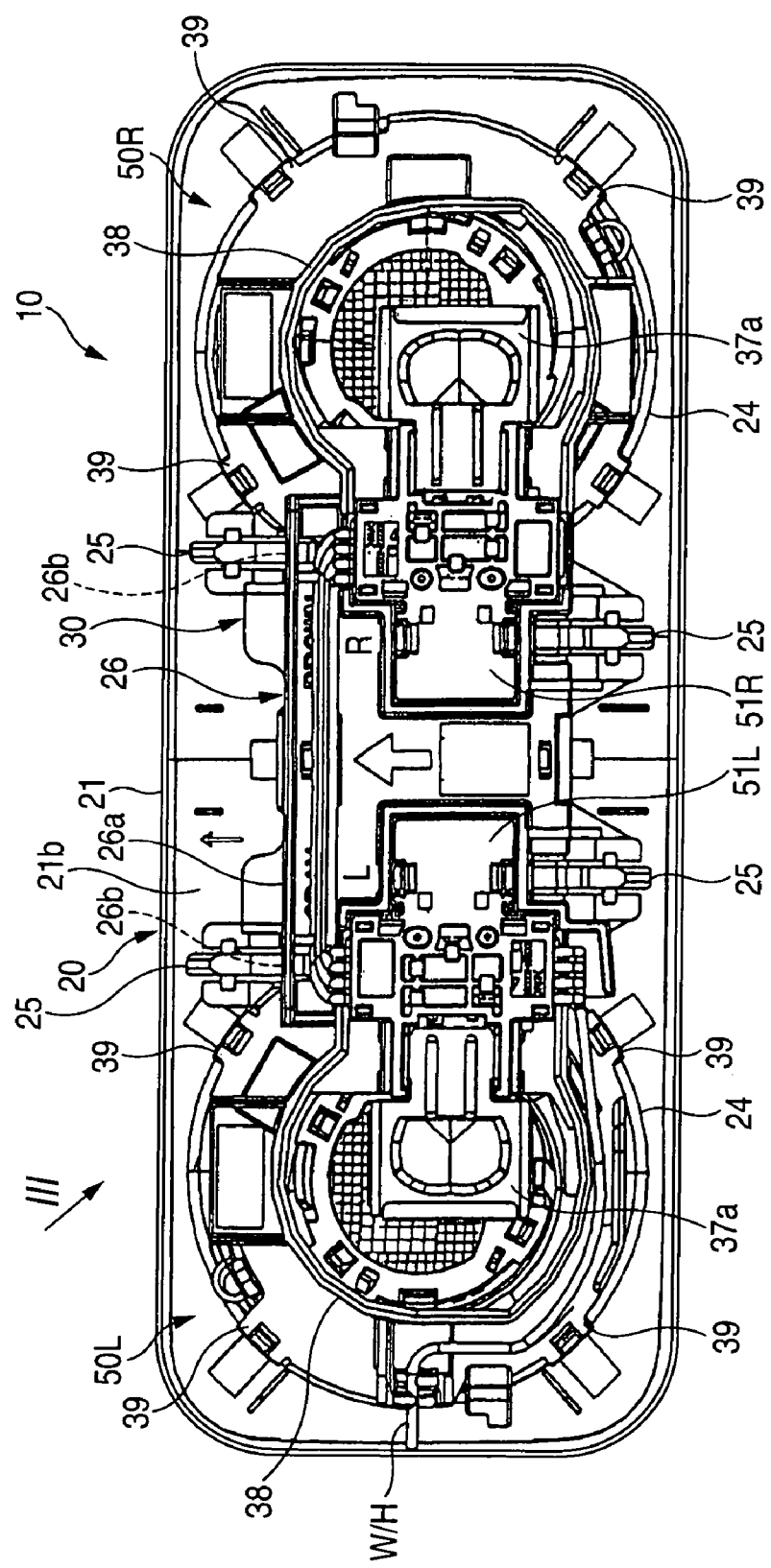
FIG. 2 is a rear view of the interior illumination lamp viewing FIG. 1 from II direction.
Figure 3:
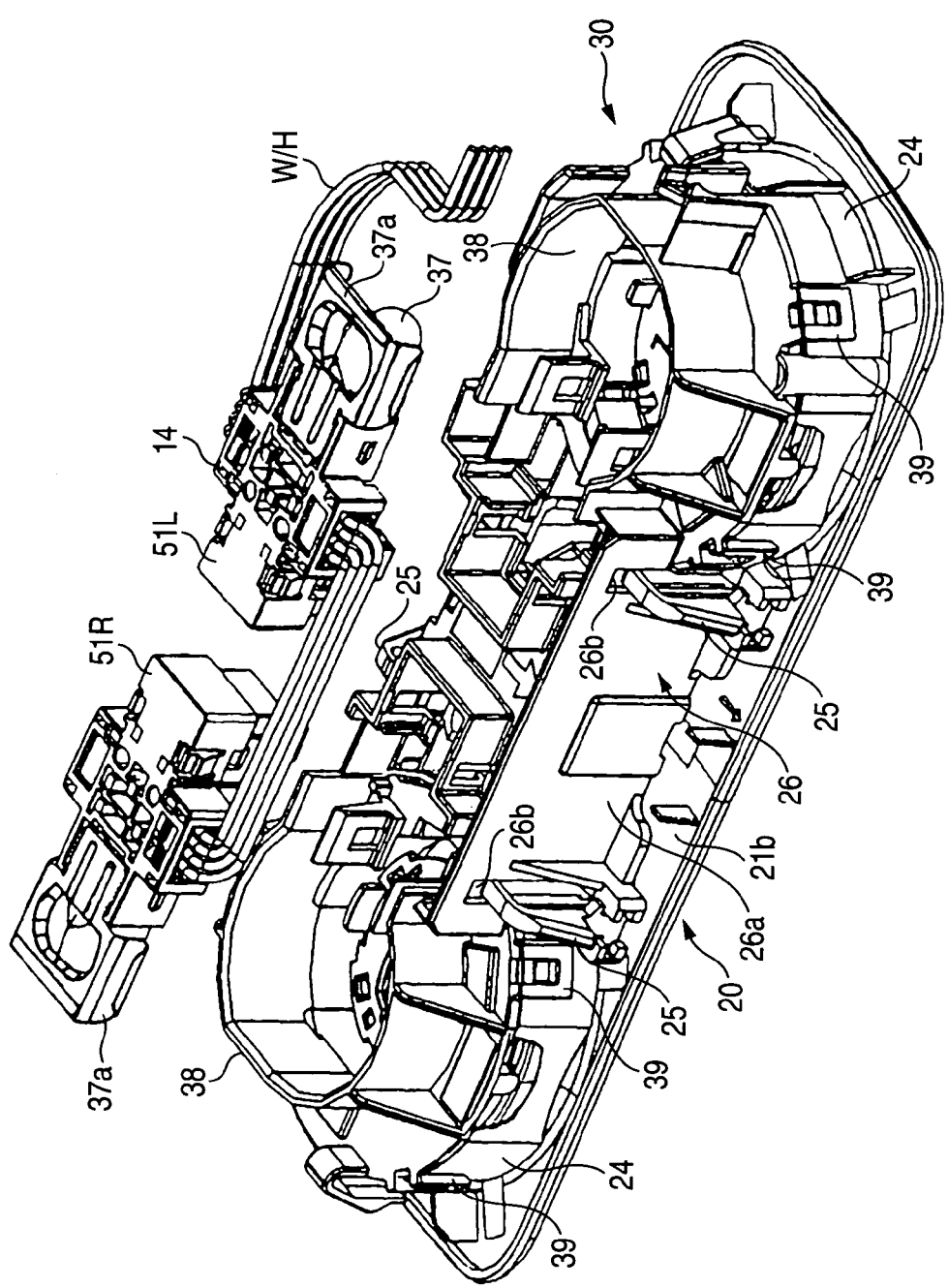
FIG. 3 is a perspective view viewing FIG. 2 from III direction.

As shown by FIG. 1 through FIG. 3, the design portion 20 includes a housing 21 having, for example, a rectangular shape a surface 21a of which is exposed to the vehicle compartment inside 12, and a center portion of the housing 21 is provided with switch holes 22L, 22R for exposing left and right switches 51L, 51R to the vehicle compartment inside 12. Further, left and right portions of the housing 21 are provided with lamp holes 23L, 23R for exposing left and right lamps 54L, 54R. The respective lamp holes 23L, 23R are provided with attaching portions 24 substantially in a shape of a circular column for attaching the functional portion main body 30 as the functional portion to the housing 21 from a rear face 21b of the housing 21 to inner sides thereof.

As shown by FIG. 1 through FIG. 3, the functional portion main body 30 is a frame-like member a total of which is formed by an oval shape, and two left and right end portions thereof include lamp containing holes 31L, 31R for containing the lamps 50L, 50R. Further, a center portion of the functional portion main body 30 includes switch containing portions 32L, 32R for attaching the switches 51L, 51R between the two lamp containing holes 31L, 31R. Further, the switches 51L, 51R are made to be easily attachable and detachable by attaching a connector 14 attached to a front end of the wire harness W/H to connecting terminals thereof (refer to FIG. 4).

A guide portion 26 in a shape of a wall for guiding the wire harness W/H is erected between the left and right lamp containing holes 31L, 31R and on front sides of the switches 51L, 51R (upper side of FIG. 2). The guide portion 26 is provided with a wall portion 26a and the wire harness W/H can be prevented from being erroneously wired by wiring the wire harness W/H along the wall portion 26a. Notches 26b (openings) are respectively provided at vicinities of two left and right portions of the guide portion 26 and inside of the notches 26b are respectively provided with clips 25 for attaching the interior illumination lamp 10 to the interior member 13 of the ceiling. Further, front ends of the wall portion 26a interposing the notched portion 26b are connected to ride over the notched portions 26b and therefore, when the wire harness W/H is wired along the guide portion 26, the problem that the wire harness W/H jumps out from the notched portion 26b as in the background art can be resolved.

Edges of the two lamp containing holes 31L, 31R are respectively provided with ring members 33 as supporting portions for supporting the lamps 50L, 50R. The respective ring members 33 are provided with guide members 38 in a shape of a circular column projected to a rear side (right side of FIG. 1) of the functional portion main body 30 and portions of the left and right guide members 38 opposed to each other are notched to thereby enable to mount various electric parts of the switches 51L, 51R, bulbs 37 or the like constituting light sources. A height of the guide member 38 is higher than those of all the mounted electric parts or the like to operate to prevent the electric parts or the like from being collided with the vehicle 11. Insides of the left and right guide members 38 are respectively attached with the bulbs 37. Further, a rear side (upper side of FIG. 3) of the bulb 37 is provided with a reflecting plate 37a to thereby enable to irradiate light emitted from the bulb 37 sufficiently in a desired direction.

As shown by FIG. 1 and FIG. 3, sliding member attaching recessed portions 35 for attaching sliding members 34 are provided at positions constituted by equally dividing an inner peripheral face of the ring member 33 into, for example, three and the sliding members 34 are inserted into the sliding member attaching recessed portions 35 to attach.

The sliding member 34 is a member substantially in a T-like shape made of a metal having elasticity and is always pressed to a spherical face 52a by an elastic force. Further, the sliding member 34 may be made of a resin and may be formed by a shape other than the substantially T-like shape.

As shown by FIG. 1 and FIG. 3, guide portions 36 are provided to outer sides of the ring members 33 of the lamp containing holes 31L, 31R to further project therefrom. Outer side faces of the guide portions 26 are for filling intervals between contiguous ones of the sliding members 34 in a shape of a concentric circle when the sliding members 34 are fitted to the sliding member attaching recessed portions 35 to attach and provided to dispose on inner sides of a concentric circle (spherical face 52a) connecting front ends of sliding faces by the sliding members 34.

Further, an outer side face of the ring member 33 is provided with a plurality of pieces of locking claw 39 for attaching the functional portion main body 30 at pertinent intervals. Therefore, by interposing the attaching portions 24 of the design portion 20 between the locking claws 39 and the ring members 33, the functional portion main body 30 and the housing 21 of the design portion 20 are coupled.

As shown by FIG. 1, left and right lamps 50L, 50R are attached between the design portion 20 and the functional portion main body 30. Further, since the left and right lamps 54L, 54R are the same, an explanation will be given of the left and right lamps 50L and 50R simply as lamps 50 in the following explanation except a case in which the notations 54L, 54R are particularly needed.

The lamp 50 includes an outer bezel 52, an inner bezel 53, a lens 54 and the like for irradiating light lay emitted from the bulb 37 in a predetermined direction via the lens 54.

The outer bezels 52 are constituted by a size of projecting front end portions thereof along the lamp holes 23L, 23R of the design portion 20 to the vehicle compartment inside 12, total portions thereof are constituted by a spherical shape and inner faces thereof are formed with the spherical faces 52a in the recessed shapes. Further, centers thereof are provided with windows 52b for fitting the lenses 54.

The inner bezel 53 includes a bezel main body 53a in a shape of a circular column, and a lens holder 53b openably and closably provided at the bezel main body 53a via a hinge 53c. Therefore, by fitting a convex face of the lens 54 to a rear end portion of the bezel main body 53a and closing the lens holder 53b, the lens 54 is doubly locked.

The left and right lamps 54L, 54R are respectively attached to the lamp containing holes 31L, 31R of the functional portion main body 30 pivotably and fixably to predetermined positions. That is, by disposing three pieces of the sliding members 34 attached to the functional portion main body 30 to an inner side of the outer bezel 52 to elastically press to the spherical face 52a, the outer bezel 52 is made to be pivotable relative to the functional portion main body 30 and fixable to a desired position.

According to the interior illumination lamp 10 described above, by wiring the wire harness W/H from the wall portion 26a of the guide portion 26, erroneous wiring can be prevented. Further, upper end portions of the notched portions 26b provided at the guide portion 26 for providing the clips 25 are connected and therefore, not only strength of the guide portion 26 can be increased but also the wired wire harness W/H can be prevented from jumping out from the notched portion 26b. Thereby, the wire harness W/H can be prevented from biting the notched portion 26b by attaching the interior illumination lamp 10.

Further, the interior illumination lamp 10 of the invention is not limited to the above-described embodiment but can pertinently be modified or improved.

For example, although according to the above-described embodiment, an explanation has been given of the case of providing 2 pieces of the clips 25 at the both end portions of the guide portion 26, a number of the clips 25 is not limited thereto.

Further, although an explanation has been given of the case of providing the pair of left and right lamps 50L, 50R, a number of the lamps 50 is arbitrary. Therefore, a number of the lamp holes 23 and a number of the switch holes 22 correspond to a number of the lamps 50 and are pertinently changed.

Otherwise, materials, shapes, dimensions, modes, numbers, arranging portions and the like of the sliding member, the outer bezel, the inner bezel, the functional portion main body, the design portion frame and the like exemplified in the above-described embodiment are arbitrary and not limited so far as these can achieve the invention.

What is claimed is:

1. An interior illumination lamp comprising:
    a design portion having a lens fixed to a bezel of a housing capable of being attached to an opening provided at an interior member of a vehicle;
    a functional portion arranged on a rear face side of the interior member supported by the design portion and having a light source;
    a guide portion including a wall having a groove thereon, for guiding an electric wire connected to the functional portion, said wall portion having notches therein; and
    clips respectively provided in the notches for securing the lamp to the interior member,
    wherein front ends of the wall portion interposing the notched portions are connected to ride over the notched portions.

2. An interior illumination lamp comprising:
    a design portion having a lens fixed to a bezel of a housing capable of being attached to an opening provided at an interior member of a vehicle;
    a functional portion arranged on a rear face side of the interior member supported by the design portion and having a light source;
    a guide portion for guiding an electric wire connected to the functional portion, said guide portion having a notch therein; and
    a clip provided in the notch for securing the lamp to the interior member.

3. An interior illumination lamp as claimed in claim 2, wherein the opening is in the shape of an elongated hole.

4. An interior illumination lamp as claimed in claim 2, wherein the guide portion is defined by a wall portion.

* * * * *